US012233837B2

(12) United States Patent
Price et al.

(10) Patent No.: US 12,233,837 B2
(45) Date of Patent: Feb. 25, 2025

(54) VEHICLE BRAKING CONTROL SYSTEM

(71) Applicant: Transportation IP Holdings, LLC, Norwalk, CT (US)

(72) Inventors: Matthew Price, McKinney, TX (US); Shankar Chandrasekaran, Erie, PA (US); Rajasekaran Murugesan, Bengaluru (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 289 days.

(21) Appl. No.: 17/507,464

(22) Filed: Oct. 21, 2021

(65) Prior Publication Data

US 2023/0045414 A1    Feb. 9, 2023

Related U.S. Application Data

(60) Provisional application No. 63/229,029, filed on Aug. 3, 2021.

(51) Int. Cl.
  *B60T 8/58*    (2006.01)
  *B60Q 9/00*    (2006.01)
  *B60T 7/12*    (2006.01)

(52) U.S. Cl.
  CPC ............... *B60T 8/58* (2013.01); *B60Q 9/00* (2013.01); *B60T 7/12* (2013.01); *B60T 2210/20* (2013.01);
  (Continued)

(58) Field of Classification Search
  CPC .... B60T 13/662; B60T 17/22; B60T 2210/20; B60T 2210/30; B60T 2220/04;
  (Continued)

(56) References Cited

U.S. PATENT DOCUMENTS 4,790,607 A  * 12/1988 Atkins ................... B60T 8/1764
                                                            303/61
5,706,909 A  *  1/1998 Bevins ..................... B60R 25/25
                                                            188/162

(Continued)

FOREIGN PATENT DOCUMENTS

CN          208343935 U       1/2019
CN          110435623 A      11/2019
(Continued)

OTHER PUBLICATIONS

Office Action mailed Dec. 1, 2022 for corresponding Eurasian Application No. 202291775. English translation provided. (5 pages).
(Continued)

*Primary Examiner* — Carl C Staubach
(74) *Attorney, Agent, or Firm* — K&L Gates LLP

(57) ABSTRACT

A system (e.g., a vehicle control system) includes a brake control unit that is configured to be operably deployed onboard a vehicle. The brake control unit has one or more sensor inputs and one or more control outputs. One of the sensor units is configured to receive a speed signal from a speed sensor of the vehicle; the speed signal is indicative of a vehicle speed detected by the speed sensor. One of the control outputs is configured for connection to a brake system of the vehicle. The brake control unit is configured to generate a vehicle control signal to initiate a vehicle brake operation responsive to the speed indicated by the speed signal going above a designated first speed threshold and the speed signal meeting one or more first designated criteria in addition to the first speed threshold.

20 Claims, 7 Drawing Sheets

(52) U.S. Cl.
CPC ....... *B60T 2210/30* (2013.01); *B60T 2220/04* (2013.01); *B60T 2230/00* (2013.01); *B60T 2250/00* (2013.01); *B60T 2250/04* (2013.01)

(58) Field of Classification Search
CPC ............. B60T 2230/00; B60T 2250/00; B60T 2250/04; B60T 2270/402; B60T 2270/416; B60T 7/12; B60T 7/20; B60T 8/32; B60T 8/58; B60Q 9/00
See application file for complete search history.

(56) References Cited

U.S. PATENT DOCUMENTS

| | | | | |
|---|---|---|---|---|
| 9,963,126 | B1* | 5/2018 | Wright | B60T 13/662 |
| 11,780,413 | B1* | 10/2023 | Nack | B62J 45/412 |
| | | | | 701/70 |
| 2015/0002284 | A1* | 1/2015 | Matsuno | B60T 8/17616 |
| | | | | 340/435 |
| 2016/0075332 | A1* | 3/2016 | Edo-Ros | B60W 30/0956 |
| | | | | 701/70 |
| 2016/0240084 | A1* | 8/2016 | Takeuchi | B60T 7/22 |
| 2016/0272228 | A1* | 9/2016 | LeFebvre | H04L 67/12 |
| 2018/0201212 | A1* | 7/2018 | Ostling | B60R 21/013 |
| 2018/0236987 | A1* | 8/2018 | Wright | B60T 15/021 |
| 2019/0034742 | A1* | 1/2019 | Gokan | G08G 1/16 |
| 2019/0351899 | A1 | 11/2019 | Adam et al. | |
| 2020/0189336 | A1* | 6/2020 | Sharma | B60T 7/22 |
| 2020/0247369 | A1* | 8/2020 | Ahnfalk | B60W 50/085 |
| 2021/0276525 | A1* | 9/2021 | Mazzoleni | B60T 8/171 |

FOREIGN PATENT DOCUMENTS

| | | |
|---|---|---|
| KR | 1020140016017 A | 2/2014 |
| RU | 2670405 C1 | 10/2018 |
| RU | 2744642 C1 | 3/2021 |
| WO | 2016002276 A1 | 1/2016 |

OTHER PUBLICATIONS

Office Action mailed Mar. 20, 2023 for corresponding Eurasian Application No. 202291775. English translation provided. (8 pages).
Search Report mailed Nov. 10, 2022 for corresponding Eurasian Application No. 202291775 (4 pages).
English Translation of Search Report mailed Nov. 10, 2022 for corresponding Eurasian Application No. 202291775 (3 pages).
First Examination Report mailed Nov. 21, 2023 for corresponding Australian Application No. 2022204189 (7 pages).

* cited by examiner

VEHICLE BRAKING CONTROL SYSTEM

CROSS-REFERENCE TO RELATED APPLICATIONS

This application claims priority to U.S. Provisional Application No. 63/229,029, which was filed on 3 Aug. 2021, and the entire disclosure of which is incorporated herein by reference.

BACKGROUND

Technical Field

Embodiments of the subject matter described herein relate to vehicle control systems. Other embodiments relate to systems for automatically braking a vehicle, e.g., for safety purposes.

Discussion of Art

Some vehicle control systems automatically brake a vehicle (e.g., to slow or stop the vehicle) responsive to the occurrence of designated criteria relating to operation of the vehicle. For example, a rollback or runaway vehicle prevention system may automatically brake a vehicle responsive to detecting vehicle movement when the vehicle has been controlled into a state (e.g., parked) where it is not supposed to be moving. In another example, a vehicle operator alerter system may be configured to generate alerts to a vehicle operator responsive to when it is detected that the vehicle is moving. The alerts are meant to assess operator alertness; if the operator does not manually deactivate the alert (or otherwise respond to the alert in a designated manner), the operator alerter system automatically initiates a penalty brake action or other designated vehicle braking action. Both instances involve detecting when a vehicle is moving, typically using a speed sensor. However, vehicles may be bumped (e.g., when coupling with other vehicles) or otherwise subjected to conditions where a speed sensor generates a signal indicative of vehicle movement, causing automatic brake activation, despite the vehicle not actually moving in a way that warrants it. Such inadvertent and unneeded braking may cause scheduling delays and/or waste operator time/resources.

Therefore, it may be desirable to provide a vehicle braking control system and method that differ from existing systems and methods.

BRIEF DESCRIPTION

In one or more embodiments, a system (e.g., a vehicle control system) includes a brake control unit that is configured to be operably deployed onboard a vehicle. The brake control unit has one or more sensor inputs and one or more control outputs. One of the sensor units is configured to receive a speed signal from a speed sensor of the vehicle; the speed signal is indicative of a vehicle speed detected by the speed sensor. One of the control outputs is configured for connection to a brake system of the vehicle. The brake control unit is configured to generate a vehicle control signal to initiate a vehicle brake operation responsive to the speed indicated by the speed signal going above a designated first speed threshold and the speed signal meeting one or more first designated criteria in addition to the first speed threshold.

In one or more embodiments, a system (e.g., a vehicle control system) includes a brake control unit that is configured to be operably deployed onboard a vehicle. The brake control unit has one or more sensor inputs and one or more control outputs. One of the sensor units is configured to receive a speed signal from a speed sensor of the vehicle; the speed signal is indicative of a vehicle speed detected by the speed sensor. One of the control outputs is configured for connection to a brake system of the vehicle. The brake control unit also includes a mitigation unit and an automatic brake actuator. The automatic brake actuator is configured to automatically generate a vehicle control signal to initiate a vehicle brake operation responsive at least in part to the vehicle speed indicated by the speed signal going above a designated first speed threshold. The mitigation unit is configured to disable the automatic brake actuator from automatically generating the vehicle control signal responsive to one or more of (i) the speed signal meeting one or more first designated criteria in addition to the first speed threshold or (ii) received operational data meeting one or more second designated criteria different than the first designated criteria. The operational data relates to one or more operational conditions of the vehicle other than the speed.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
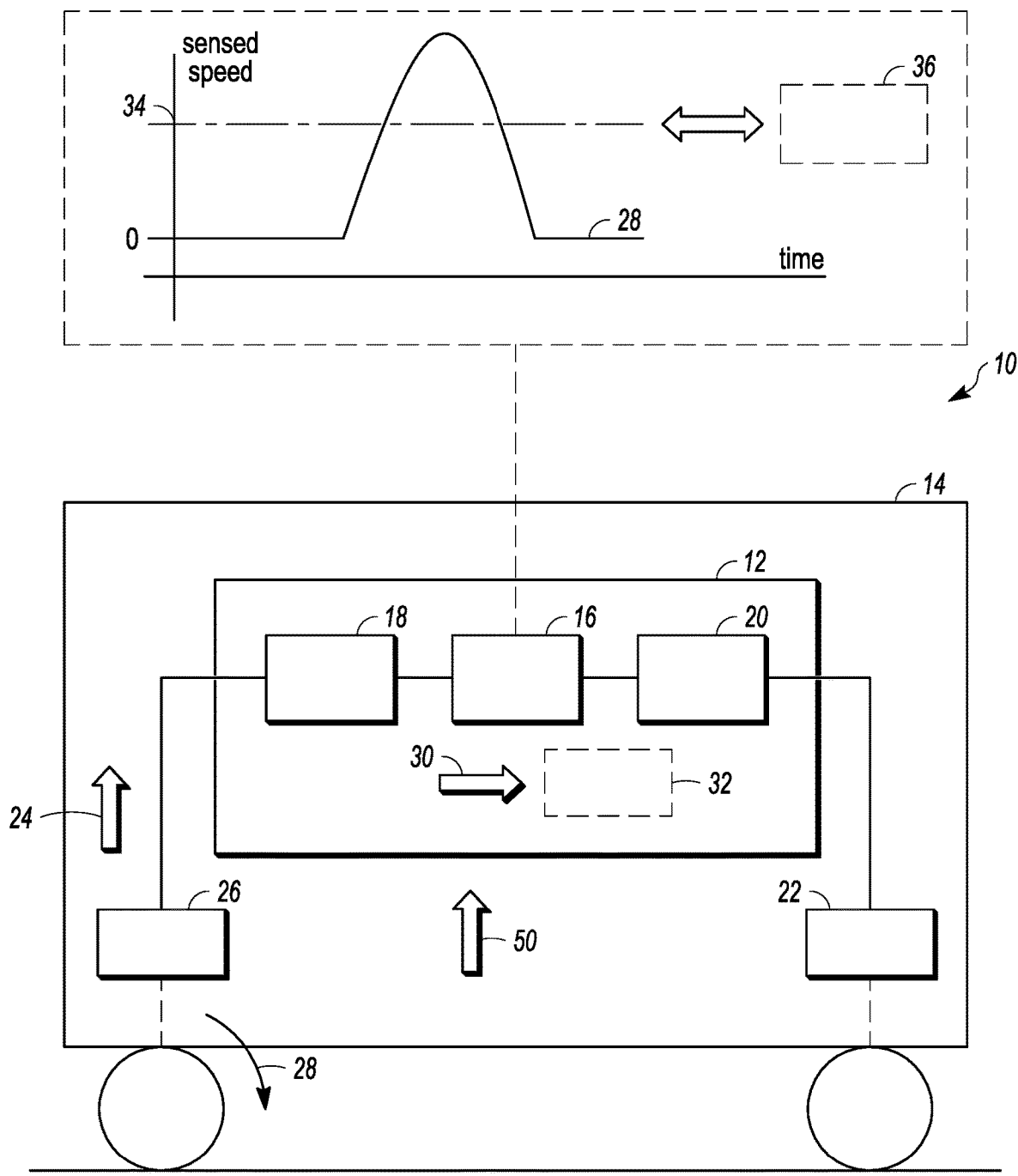
FIG. 1 is a schematic illustration of a vehicle braking control system, according to a first embodiment.

Embodiments of the subject matter described herein relate to a system (e.g., a vehicle control system) that includes a brake control unit configured to be operably deployed onboard a vehicle, e.g., a locomotive or other rail vehicle, or on-road vehicle such as a semi-trailer truck. The brake control unit has one or more sensor inputs and one or more control outputs. One of the sensor units is configured to receive a speed signal from a speed sensor of the vehicle. The speed signal is indicative of a vehicle speed detected by the speed sensor. One of the control outputs is configured for connection to a brake system of the vehicle. The brake control unit is configured to generate a vehicle control signal to initiate a vehicle brake operation responsive to the speed indicated by the speed signal going above a designated first speed threshold and the speed signal meeting one or more first designated criteria in addition to the first speed threshold.

In one aspect, the brake control unit may include an operator alerter, and the vehicle brake operation initiated by the vehicle control signal may include triggering or activating the operator alerter. When triggered, the operator alerter is configured to generate an alert and to control the brake system to brake the vehicle responsive to an operator failing to respond in a designated manner to the alert (e.g., manually clear the alert by manipulating a designated control input). As relating to the speed signal, instead of the operator alerter being triggered (to generate the alert, etc.) solely upon the detected vehicle speed going above the designated first speed threshold, the brake control unit is configured to generate the vehicle control signal to trigger the operator alerter when the speed goes above the threshold and when the speed signal also meets other criteria. As explained below, the other criteria can be selected to avoid triggering the operator alerter due to "false positives," i.e., increases in detected speed that result from transient events or other events that are not reflective of actual situations where the operator alerter should be activated.

In another aspect, the brake control unit may be configured to implement a rollback or runaway prevention function, wherein if vehicle movement is detected under certain circumstances where vehicle movement is not expected or intended (e.g., the vehicle is parked), the vehicle is automatically braked to bring the vehicle to a stop. Here, the vehicle brake operation initiated by the vehicle control signal may include actuating the vehicle brake system to brake the vehicle. Again, as relating to the speed signal, instead of the brake control unit being configured to generate the vehicle control signal (to brake the vehicle) solely upon the detected vehicle speed going above the designated first speed threshold, the brake control unit is configured to generate the vehicle control signal when the speed goes above the threshold and when the speed signal also meets other criteria. Again, the other criteria can be selected to avoid triggering the safety braking due to false positives of the speed signal.

It may be the case that the brake control unit (e.g., including an operator alerter, or a rollback or runaway prevention function) requires other conditions for generating the control signal to initiate the vehicle brake operation, which are not directly related to speed. For example, that the brake system of the vehicle be in a designated condition, e.g., brake pipe or brake cylinder pressurized at, or under or over, a designated level. In such an instance, the brake control unit may be configured to additionally take these other conditions into account for generating the control signal (e.g., to activate the operator alerter) or not. However, in this embodiment, if all the other, non-speed conditions are met, activation may require both the speed (as indicated by the speed signal) going above the threshold and the speed signal meeting the other criteria.

At least some of the time while the vehicle is powered and operational, the speed sensor will continuously generate the speed signal. For assessing the speed signal relative to the one or more first designated criteria (in addition to the first speed threshold), the brake control unit may be configured to assess the portion of the speed signal indicative of the speed going above the threshold (the 'speed transition portion') and also other portions of the speed signal that are temporally proximate to the speed transition portion. "Proximate" meaning portion(s) of the speed signal (or other events) that are within a relatively short, designated time window before and/or after the speed transition portion. The time window may be selected/designated based on the maximum allowable time (e.g., under government regulations) for initiating a vehicle brake operation after detecting a speed above the threshold (e.g., 10 seconds), and/or based on empirical data of the timing of typical transient conditions that may generate speed false positives. For example, a coupling operation (of one vehicle mechanically coupling to another vehicle) might take 1 to 3 seconds. Assessing a speed signal within a 1 to 3 second window on either side of (or at least after) the time of the speed transition portion (when the speed signal indicates the detected vehicle speed went above the designated threshold) can be used to distinguish the coupling event from other events. In one example, the proximate portion of the speed signal after the speed transition portion (which the brake control unit assesses) may be no more than 10 seconds. In another example, it may be no more than 5 seconds.

Turning now to the figures, FIG. 1 illustrates an embodiment of a vehicle control system 10 that includes a brake control unit 12 configured to be operably deployed onboard a vehicle 14 (e.g., configured to receive and run on electrical power available onboard the vehicle). The brake control unit may include one or more processors 16, one or more sensor inputs 18, and one or more control outputs 20. The brake control unit may be implemented on, or as part of, a vehicle control system that controls the vehicle generally, or it may be a standalone unit that interfaces with other systems of the vehicle. One of the control outputs is configured for connection to a brake system 22 of the vehicle. One of the sensor units is configured to receive a speed signal 24 from a speed sensor 26 of the vehicle. The speed sensor may be, for example, a Hall Effect sensor or a variable reluctance sensor that detects variances in a magnetic field due to movement of a gear attached to a vehicle axle or wheel. Generally, the speed signal is indicative of a vehicle speed 28 detected by the speed sensor. However, the detected speed may include speed transients, where the detected speed goes above a threshold momentarily and then returns to below the threshold, e.g., to zero. Such transients may be caused by shocks from the vehicle coupling with another vehicle, by strong gusts of wind rocking a vehicle, or from train "run in" and "run out," where couplers are subjected to momentary compressive or tensile forces (i.e., shocks), as rail cars move towards or away from either other due to braking or positive traction, respectively, to the limit of coupler slack. Thus, in one aspect, the brake control unit is configured to generate a vehicle control signal 30 to initiate a vehicle brake operation 32 responsive to the speed 28 indicated by the speed signal 24 going above a designated first speed threshold 34 and the speed signal also meeting one or more first designated criteria 36 (e.g., stored in a memory unit) in addition to the first speed threshold. For example, the criteria 36 may be selected to exclude certain speed transients, to mitigate initiating vehicle brake operations in unwarranted situations. Or, to put it another way, the brake control unit may be configured to generate the vehicle control signal responsive to the speed indicated by the speed signal going above the threshold, unless the speed signal is assessed as having designated characteristics that are indicative of a false positive, e.g., a detected speed transient, resulting from a coupler shock or otherwise, that does not indicate a prolonged and continued speed or acceleration.

In any of the embodiments herein, the first speed threshold 34 may be 0.1 MPH (0.16 KPH). This reflects that the brake control unit (e.g., including an operator alerter or otherwise) may be configured to potentially initiate a designated vehicle brake operation (e.g., activating the operator alerter) upon detecting relatively very small vehicle speeds. Detecting such speeds is particularly susceptible to noise or false positives. For example, a system configured to detect a transition to above 10 MPH (16 KPH) would not be triggered by a coupler shock that the speed sensor registers as a transient speed of 0.1 MPH, 0.2 MPH, or even 1 MPH. However, systems configured to detect sensed vehicle speed going above 0.1 MPH would be triggered by such events.

In other embodiments, the speed threshold may be higher or lower than 0.1 MPH (0.16 KPH). For example, 0.1 KPH. Or, as another example, 5 MPH (8 KPH). Again, the designated amount may be selected based on government or agency rules or regulations, and/or based on the particular vehicle brake operation in question. For example, it may be desirable to have a lower speed threshold for an operator alerter, or a different speed threshold for rollback or runaway prevention.

Figure 2:
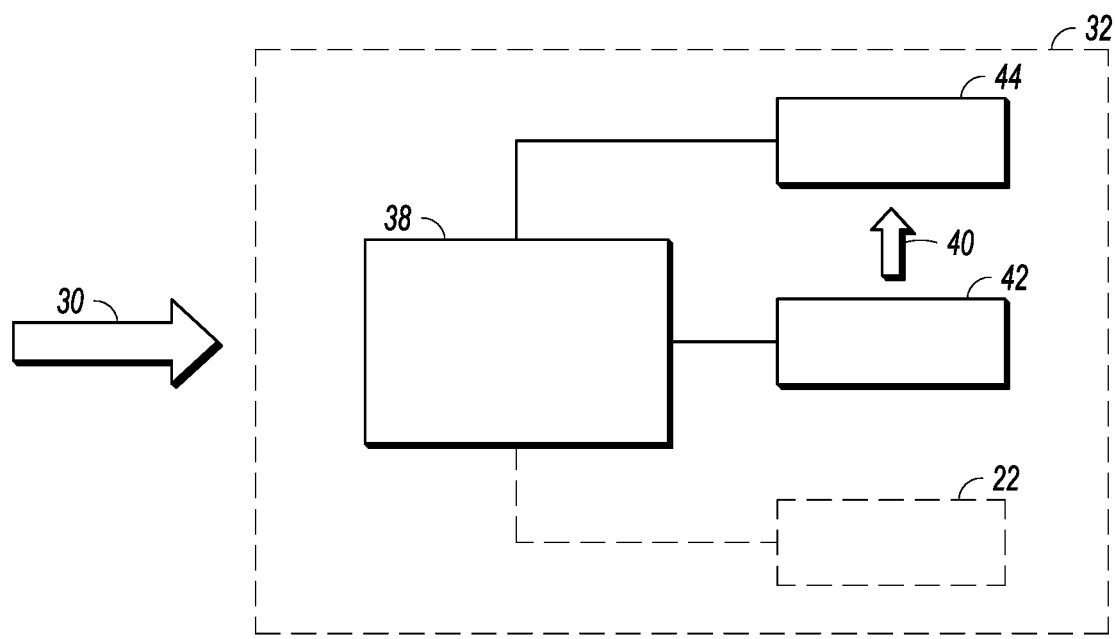
FIG. 2 is a schematic illustration of aspects of the vehicle braking control system, according to other embodiments.

As shown in FIG. 2, in any of the embodiments herein, the vehicle brake operation (i.e., vehicle brake process) 32 initiated by the vehicle control signal 30 may include activation of an operator alerter 38 that is configured to generate an alert 40, and to control the brake system 22 to brake the vehicle responsive to an operator failing to respond in a designated manner to the alert. For example, the operator alerter may control a display screen, light element, audio output device, or other electronic user interface or notification device 42 to display or sound the alert as a visual or audio signal, respectively. If an operator acknowledges the alert in a designated manner (e.g., by manipulating an input device 44 in a designated manner) within a designated time period after the alert is commenced, as might indicate that the operator is alert and aware, the operator alerter clears the alert and takes no braking action. (The operator alerter may be configured to generate subsequent alerts after a designated time delay and/or based on vehicle conditions, for periodically verifying operator alertness.) If not, as might indicate the operator is not alert and aware, the operator alerter is configured to control the brake system to brake the vehicle. For example, in a train context, application of a penalty brake.

In other embodiments, such as where the brake control unit is configured for selective operation in a rollback or runaway prevention mode, the vehicle brake operation initiated by the vehicle control signal may include controlling the brake system to brake the vehicle, e.g., the vehicle control signal may be formatted or otherwise configured to activate the brake system to brake the vehicle. The brake control unit may be configured to operate in the rollback or runaway prevention mode responsive to a designated control input or inputs. For example, responsive to the vehicle being placed in a 'park' mode, responsive to a determination that all human operators have left an operator cab of the vehicle, responsive to selection of a designated control input (e.g., an operator selecting a "runaway prevention" input of a vehicle user interface), etc. Thus, as mentioned above, generation of the vehicle control signal may be contingent upon not only the speed signal being indicative of the sensed vehicle speed going above the threshold and the speed signal meeting the other criterion or criteria, but the occurrence of the designated control input(s) that activates the rollback or runaway prevention mode generally.

As explained above, the brake control unit may be configured to generate the vehicle control signal to initiate a vehicle brake operation responsive to the speed indicated by the speed signal going above the designated first speed threshold and the speed signal meeting one or more first designated criteria in addition to the first speed threshold. In embodiments, the one or more first designated criteria include a rate of change of the vehicle speed being below a designated acceleration threshold. For example, the brake control unit may be configured to calculate one or more derivatives of the speed (from the speed signal) or to otherwise determine a rate of change of the speed in the time period(s) proximate to when the speed went above the first speed threshold; generally, a rate of change of speed corresponds to acceleration. If the rate of change of the vehicle speed is below the designated acceleration threshold, this indicates the acceleration is gradual, which is in turn indicative of prolonged and normal vehicle acceleration due engine/motor tractive effort. On the other hand, if the rate of change of the vehicle speed is above the designated acceleration threshold, this indicates the acceleration is abrupt (an impulse), which is in turn indicative of the vehicle being subjected to a shock due to coupling or other interactions with other vehicles, for example. Thus, the vehicle brake operation is initiated responsive to the former, but not the latter, which is likely a false positive. The acceleration threshold may be selected based on empirical evidence of known acceleration events of the vehicle. For example, plural measurements of acceleration due to tractive effort (resulting in a data set of relatively lower acceleration values) versus plural measurements of detected acceleration during vehicle coupling or run-in or run out (resulting in a data set of relatively higher acceleration values), with the acceleration threshold selected as a value between the two sets.

In another embodiment, the one or more first designated criteria may also include the determined acceleration (rate of change of detected speed) failing to transition back to zero or near zero within a designated time period. Or, to put it another way, the vehicle brake operation is not initiated if the determined acceleration goes back to zero or near zero with the designated time period. To explain, if the determined acceleration returns to zero within a short, designated time period, this reflects a brief acceleration event, which may be indicative of vehicle coupling or another vehicle-to-vehicle interaction where it may not be necessary to initiate the vehicle brake operation. On the other hand, a prolonged acceleration, longer than the designated time period, may reflect normal vehicle movement due to engine/motor tractive effort (or action due to gravity), where it may be necessary to initiate the vehicle brake operation (e.g., if any other pre-conditions are present). The designated time period may be selected based on empirical evidence, e.g., an observed/measured maximum length of time of typical coupler events, such as a vehicle coupling with another vehicle, or the length of time a coupler experiences a force upon run-in or run-out. (In the context of an acceleration profile, a "return to zero" means, after a positive acceleration event, returning to zero acceleration after a corresponding negative acceleration event, it being recognized that upon acceleration from zero speed to some constant non-zero positive speed, the acceleration would be zero.)

Figure 3:
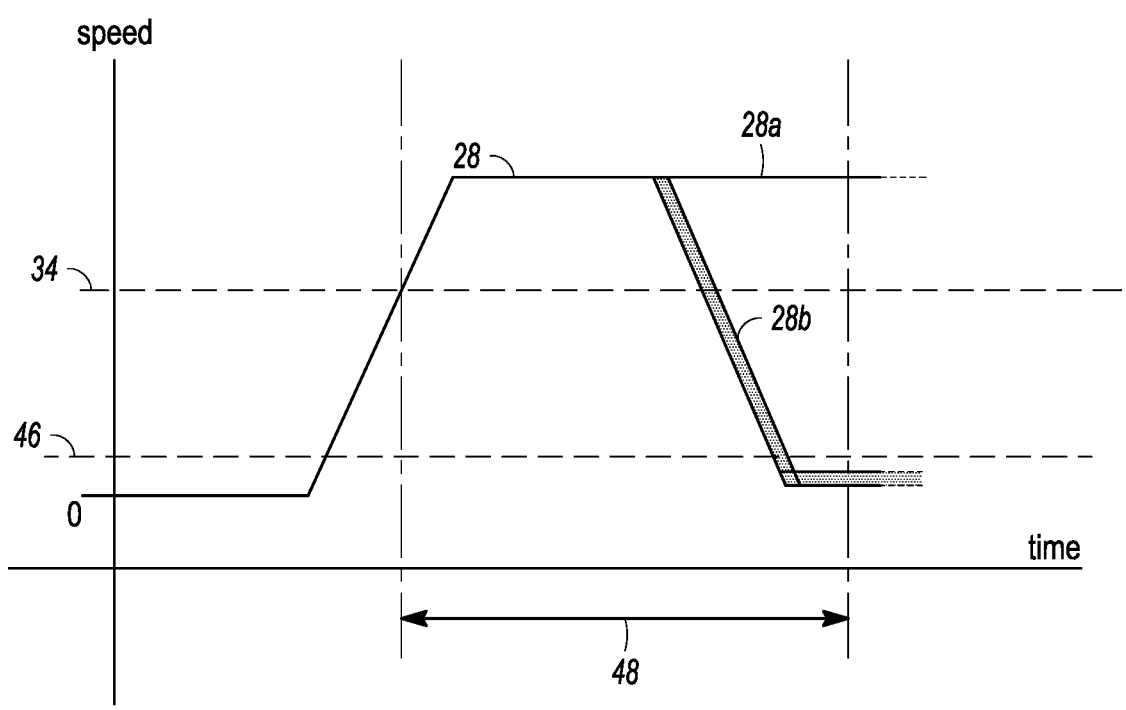
FIG. 3 is a schematic illustration of aspects of the vehicle braking control system, according to other embodiments.

In other embodiments, with reference to FIG. 3, the one or more first designated criteria include the detected vehicle speed 28 failing to fall to a designated second speed threshold 46 within a designated time period 48. The second speed threshold is less than the first speed threshold, and may be at zero or near zero, meaning at or within a designated percentage of the first speed threshold from zero, e.g., 20 percent. (At 20 percent, a first threshold of 0.1 MPH would mean a second speed threshold of 0.02 MPH. This reflects that the speed sensor signal may be subject to electrical or other minor noise, which may result in a detected speed of 'not quite zero,' even if actual vehicle speed is zero.) The designated time period 28 may commence when the speed transitions over the first threshold, and its length may be selected based on the time lengths of coupling events or other "false positive" events, as determined empirically, for example. In operation, if the detected vehicle speed goes above the first threshold and stays above the second threshold for at least the designated time period 48 (e.g., as along plot/line 28a), the brake control unit may generate the vehicle control signal. Conversely, if the detected vehicle speed goes above the first threshold and then falls to the second threshold within the designated time period 48 (e.g., as along plot/line 28b), the brake control unit does not generate the vehicle control signal.

In other embodiments, similar to the embodiment of FIG. 3, the one or more first designated criteria may include the detected vehicle speed 28 failing to fall below the first threshold 34 within a designated time period. Here, the brake control unit may be configured to generate the vehicle control signal to initiate a vehicle brake operation responsive to (i) the speed indicated by the speed signal going above the designated first speed threshold and (ii) the speed indicated by the speed signal staying above the designated first speed threshold for at least the designated time period. Or, in other words, the brake control unit may be configured to generate the vehicle control signal to initiate a vehicle brake operation responsive to the speed indicated by the speed signal going above the designated first speed threshold, unless the speed indicated by the speed signal goes below the designated first speed threshold within the designated time period, in which case no signal is generated.

In any of the embodiments herein, the brake control unit may be further configured to receive operational data 50 (see FIG. 1) relating to one or more operational conditions of the vehicle other than the vehicle speed, and to generate the vehicle control signal to initiate the vehicle brake operation responsive to all of: the vehicle speed indicated by the speed signal going above the designated first speed threshold; and the speed signal meeting the one or more first designated criteria in addition to the first speed threshold; and the operational data meeting one or more second designated criteria different than the first designated criteria. (Where applicable, these factors may be assessed proximally, i.e., that they occur within a relatively short designated time period of one another.)

For example, the operational data may include a location of the vehicle, and the one or more second designated criteria may include the vehicle being outside a yard or other designated area and/or the vehicle being off a grade. Here, it is recognized that if a vehicle is in a yard, transient speed events may be indicative of the vehicle coupling with another vehicle in the yard, where the vehicle brake operation is not initiated. Similarly, if a vehicle is on a grade, transient speed events may be indicative of run-in or run-out, again, where the vehicle brake operation is not initiated.

Vehicle location information as relating to being inside or outside a yard, on or off a grade, etc. may be provided by an energy management system of the vehicle (e.g., the Trip Optimizer™ system available from Wabtec Corp.) Such energy management systems have access to vehicle geographic location via GPS, and, for vehicle control, are configured to cross-reference the geographic location to known features of the vehicle route using a route database. The route database is a selection of data about the planned route of the vehicle, stored in memory, compiled previously from pre-existing data sources and/or by running data-collecting vehicles over the same route.

In another example, the operational data may include one or more of acceleration data from an acceleration sensor operably attached to a vehicle coupler or elsewhere on the vehicle, strain data from a strain gauge operably attached to the vehicle coupler (or elsewhere on the vehicle), or sound data from an acoustic sensor operably attached to the vehicle. Here, the one or more second designated criteria may include the acceleration data, the strain data, or the sound data failing to indicate a coupling operation of another vehicle being coupled to the vehicle. In other words, responsive to the data being indicative of a coupling operation, the brake control unit is configured not to generate the vehicle control signal to initiate the vehicle brake operation, since the change in speed (over the threshold) may be indicative of the coupling operation (i.e., a speed signal transient or impulse) and not an actual and prolonged vehicle movement.

In another example, vehicles may receive, or generate themselves, coupling requests from or to other vehicles, for requesting vehicle coupling (e.g., responsive to which the vehicles move together such that adjacent couplers of the vehicles come into contact with one another for mechanically coupling the two vehicles together). Such coupling requests are indicative of a situation where a coupler of the vehicle (having the brake control unit) may soon experience a shock or force that may register as a transient/impulse, increased speed on the speed sensor. Thus, here, the operational data may include a coupling request status, and the one or more second designated criteria may include the coupling request status being indicative of a lack of a present coupling request to couple the vehicle with other vehicles. Or, to put it conversely, the brake control unit is configured so that it will not generate the vehicle control signal if the coupling request status is indicative of a present coupling request. (Generally, the brake control unit may be configured to assess the speed signal relative to coupling requests that would have been received proximately earlier in time, within a designated time window. That is, a coupling request will be received/generated, and then the speed sensor would register a transient or impulse speed due to a force exerted on a vehicle coupler. The time window may be selected based on the typical (e.g., average) or maximum allowable time for a coupling event to occur after a vehicle receives or generates a coupling request.) Vehicles may be configured to generate coupling requests responsive to operator manipulation of a designated control input, such as pressing a designated button on a control terminal, selecting a "softkey" option displayed on a vehicle display (e.g., touchscreen), etc.

Figure 4:
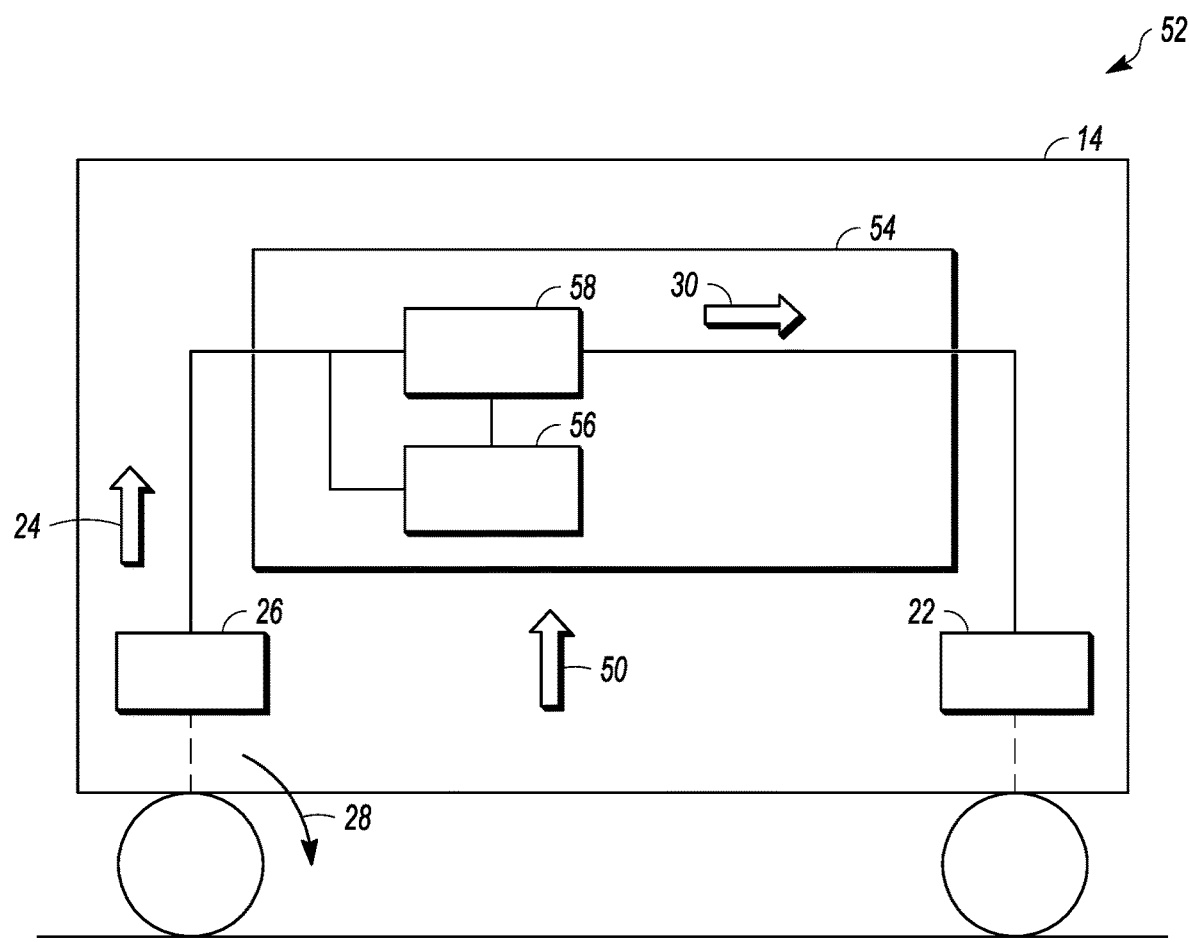
FIG. 4 is a schematic illustration of another embodiment of a vehicle braking control system.
Figure 5:
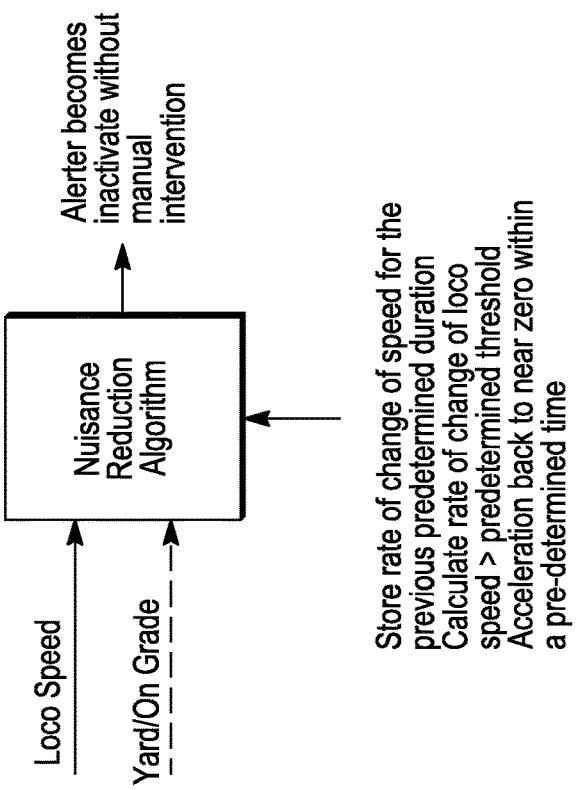
FIGS. 5, 6, 7, and 8 illustrate other embodiments of vehicle control systems.
Figure 6:
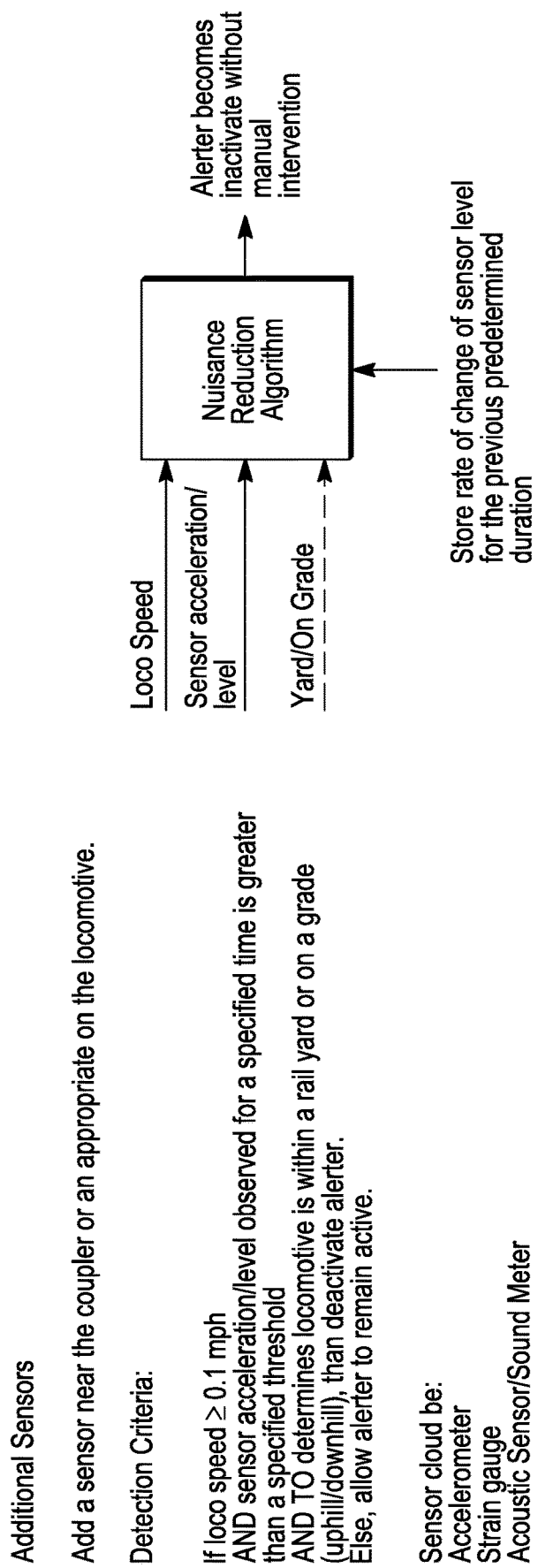
Figure 7:
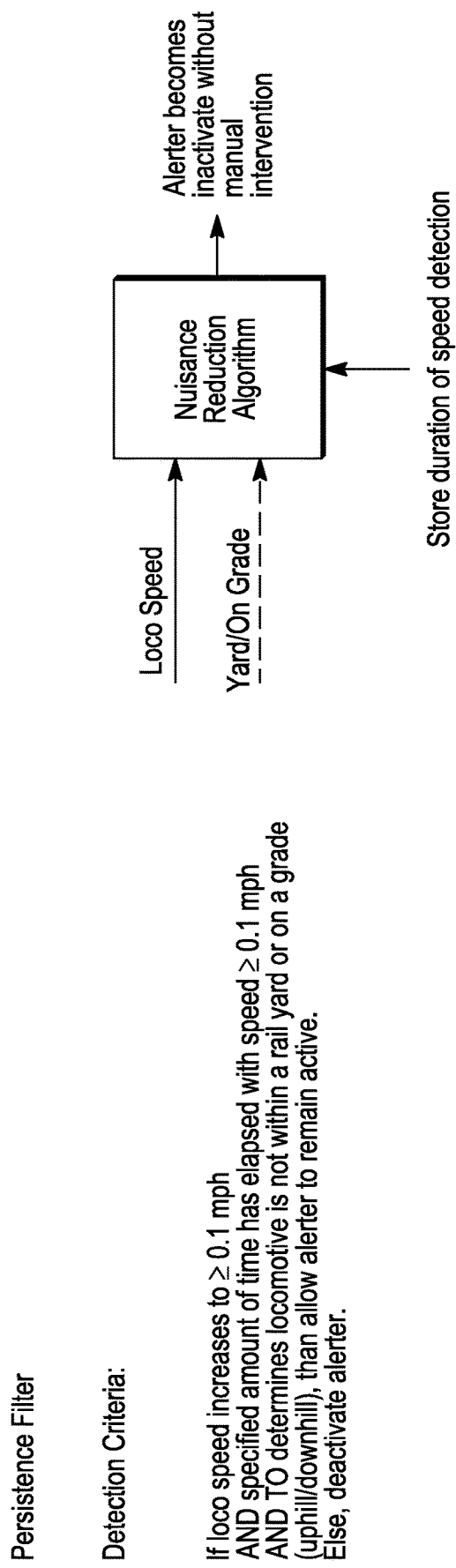
Figure 8:
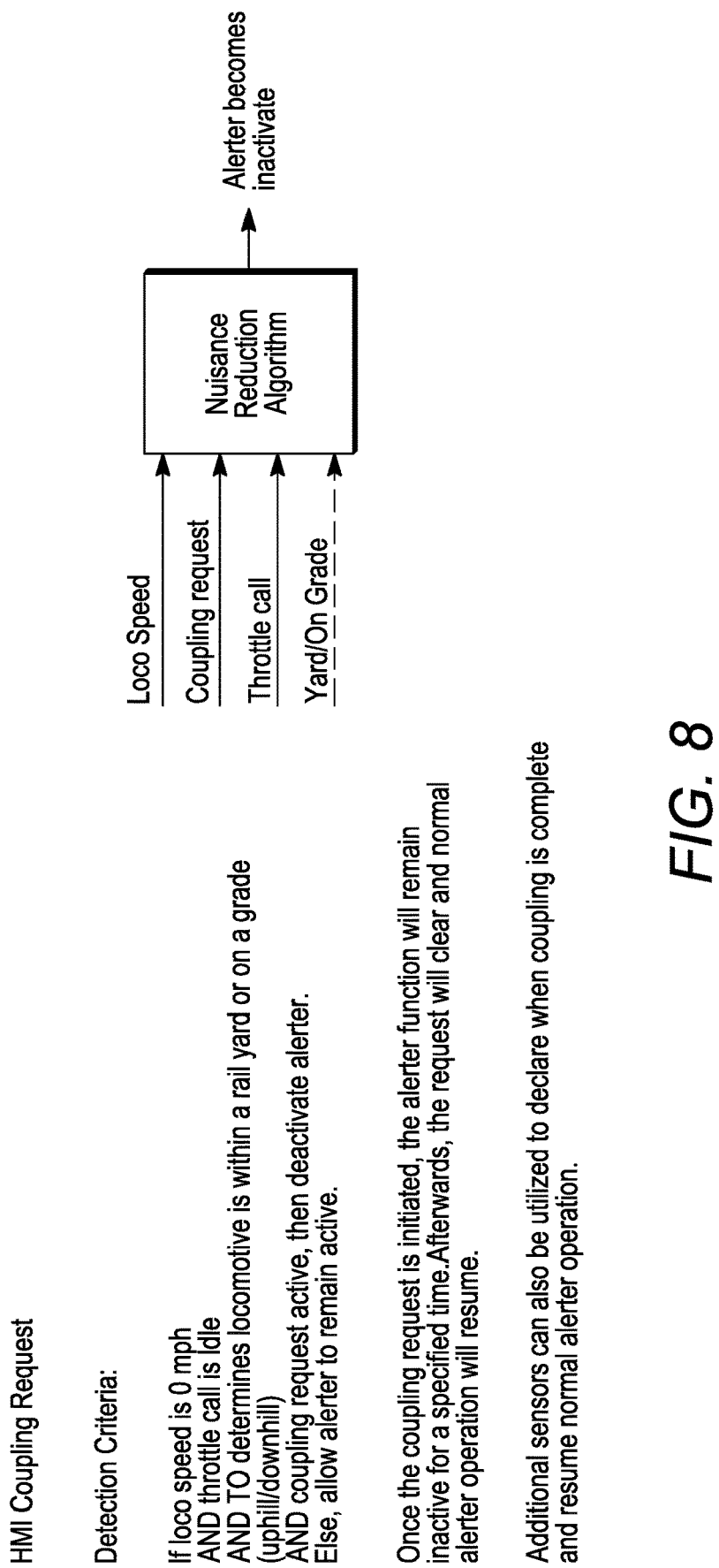

In another embodiment, with reference to FIG. 4, a system (e.g., vehicle control system) 52 includes a brake control unit 54. The brake control unit is configured to be operably deployed onboard a vehicle 14, and has one or more sensor inputs and one or more control outputs (not shown, but similar to FIG. 1). One of the sensor inputs is configured to receive a speed signal 24 from a speed sensor 26 of the vehicle 14. The speed signal is indicative of a vehicle speed 28 detected by the speed sensor. One of the control outputs is configured for connection to a brake system 22 of the vehicle. The brake control unit includes a mitigation unit 56 and an automatic brake actuator 58. (The automatic brake actuator may be an operator alerter, a rollback or runaway preventer, or other system or sub-system that is configured to automatically brake the vehicle based on sensed vehicle speed and under other designated circumstances.) The automatic brake actuator is configured to automatically generate a vehicle control signal 30 to initiate a vehicle brake operation responsive at least in part to the vehicle speed indicated by the speed signal going above a designated first speed threshold. The mitigation unit is configured to disable the automatic brake actuator from automatically generating the vehicle control signal responsive to one or more of (i) the speed signal meeting one or more first designated criteria in addition to the first speed threshold or (ii) received operational data meeting one or more second designated criteria different than the first designated criteria. The operational data relates to one or more operational conditions of the vehicle other than the detected/sensed speed. The one or more first designated criteria and/or the one or more second designated criteria may be as described above in reference to the embodiments of FIGS. 1-3 or otherwise.

In one aspect, disabling the automatic brake actuator from automatically generating the vehicle control signal may include: (i) the automatic brake actuator is "always on" but can be "turned off"/disabled by the mitigation unit; (ii) the automatic brake actuator is "off" unless "turned on" by the mitigation unit; (iii) one or both of the automatic brake actuator and the mitigation unit are embodied in electronic, discreet circuits where, due to a selected circuit configuration, operation of the automatic brake actuator is contingent upon mitigation operation of the mitigation unit; (iv) one or both of the automatic brake actuator and the mitigation unit are embodied as instructions stored in memory and executed by a processor (or processors), where the automatic brake actuator as encoded is controlled to be active or inactive, responsive to the mitigation unit controlling register "flags" (e.g., active or inactive); and/or (v) etc.

Any of the embodiments herein are applicable to single vehicles, and also to vehicle systems such as multi-car trains of rail vehicles (e.g., a locomotive connected in consist to plural transit or cargo rail cars) and semi-trailer trucks (e.g., an on-road vehicle towing or more trailers).

In any of the embodiments herein, the brake control unit may be configured to receive operational data (e.g., relating to one or more operational conditions of the vehicle other than the vehicle speed) that is indicative of vehicle position, e.g., which may originate from a GPS device, camera, or other device that is onboard or offboard the vehicle. Examples include GPS devices integrated into the vehicle, GPS devices included in electronic devices carried by personnel onboard the vehicle (e.g., smart phones or tablets), camera units integrated into the vehicle (e.g., forward-facing route monitoring cameras or rear-facing 'backup' cameras), camera units included in electronic devices carried by personnel onboard the vehicle (e.g., garment-attached safety cameras, phone cameras, etc.), camera units affixed to wayside devices, RFID devices affixed to the vehicle and/or to wayside devices, other wayside devices for detecting changes in vehicle position (e.g., barcode readers, axle counters, hotbox detectors, wheel temperature detectors, and so on), etc. In one aspect, the brake control unit may be configured to generate the vehicle control signal (to initiate the vehicle brake operation) responsive to all of: the vehicle speed indicated by the speed signal going above the designated first speed threshold; and the speed signal meeting the one or more first designated criteria in addition to the first speed threshold; and the operational data of vehicle position meeting one or more second designated criteria different than the first designated criteria, e.g., the vehicle position data indicates that the vehicle has moved to two different positions, which are at least a designated minimum distance apart, within a designated time period. (Such data, in this instance, confirming vehicle speed above a designated minimum.) Or, to put it another way, the control unit may be configured to initiate the braking operation unless the vehicle position data indicates the vehicle is not actually continuously moving above the speed threshold.

In another aspect, if vehicle position data is used as a basis for the control unit to initiate vehicle braking operations (in addition to, or instead of, vehicle speed sensor data), the control unit may be configured to in effect filter noise from the position data as part of the control process for generating the control signal or not. For example, vehicle position data indicating movement (due to the vehicle changing positions) within a designated time period may be compared to subsequently received vehicle position data in an immediately subsequent time period. If the subsequently received vehicle position data indicates that the vehicle has moved back to its original starting position within a relatively short time period (e.g., 1-3 seconds), this may be indicative of the vehicle having temporarily moved forwards and backwards (or vice versa) slightly due to a coupling interaction with another vehicle (or otherwise being bumped, nudged, or hit by another vehicle). In another example, due to variances in the GPS position calculation algorithm itself (e.g., tolerances for calculating position within a certain range), GPS data may show changes in position even if the vehicle has not moved; the control unit may be configured to filter such signal noise, for accounting for such minor position changes and disregard them for initiating vehicle brake operations.

In any of the embodiments herein, the system may include a speed detection device, location or position sensing device, acceleration sensing device, etc., integrated onboard a vehicle, otherwise located onboard the vehicle (e.g., carried by a person), offboard the vehicle but in communication with the vehicle via wireless or other communication (e.g., communication over a catenary or running rail), etc., which provides data to the control unit. The control unit is configured to generate the control signal (to initiate a vehicle brake operation) based on such received data meeting or not meeting various designated criteria. For example, speed, acceleration, and/or position data from a smart phone or tablet may be assessed relative to various designated criteria to filter noise that might otherwise trigger an operator alerter or similar system, e.g., if the data indicates a speed above a threshold for triggering the alerter but also meets other criteria indicative of the sensed speed being a speed pulse/noise (e.g., temporary sensed increase in speed due to a shock, as opposed to a prolonged speed increase due to vehicle traction movement), the data may be "filtered" as noise and the brake operation (e.g., alerter) thereby not triggered. Thus, embodiments of the invention are applicable to any speed detection device, location sensing device, and/or a standalone speed sensor or one which is integrated with the vehicle control, where data from the device is filtered to remove signal noise as set forth herein.

In any of the embodiments herein, the control unit may be configured to generate the control signal(s) (to initiate a brake operation, such as activating an operator alerter) based on cross-correlating respective data from multiple received signals, e.g., a speed sensor signal and an accelerometer signal. Here, the control unit could be configured to generate the control signal responsive to if the speed sensor signal shows the vehicle speed above a first designated threshold, and if the accelerometer signal concurrently meets designated criteria that are indicative of a lack of sharp acceleration due to bumping or coupling, for example. Data from other sources, which tends to confirm prolonged vehicle movement versus sharp jolts due to coupling only, could also be considered. Also, data from multiple sensors that generate the same category or type of data (e.g., speed data) could be taken into account, e.g., multiple speed sensors on board the rail vehicles of a train, or on board on locomotive or other vehicle.

For example, for a vehicle system (e.g., train) having plural speed sensors and/or plural accelerometers, the control unit could be configured to compare or correlate the received data output of all the sensors within a designated time window. (The time window could be selected based on the timing of typical events that occur in the vehicle system, as determined empirically, e.g., timing of a vehicle system to transition from a stopped or parked state to ongoing movement along a route, vs. timing of coupling actions in the vehicle system.) The control unit would be configured to generate the control signal responsive to the received data meeting various designated criteria, alone (e.g., data from one sensor assessed relative to designated criteria) and/or in comparison (e.g., data from a group of the same type of sensors compared to one another, or data from one sensor compared to data from another, different type of sensor, or data from a group of sensors compared to data from a group of other sensors of the same or different type). For example, speed or acceleration spikes shown in received sensor signals could be compared within a time window to verify actual and prolonged vehicle movement (as might warrant initiating the operator alerter, for example) versus jolts or bumps from coupling (for example) without associated actual/prolonged vehicle movement.

In one embodiment, the control system may have a local data collection system deployed that may use machine learning to enable derivation-based learning outcomes. The control system may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The control system may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a brake control unit configured to be operably deployed onboard a vehicle and having one or more sensor inputs and one or more control outputs, at least one of the one or more sensor inputs configured to receive a speed signal from a speed sensor of the vehicle, the speed signal indicative of a vehicle speed detected by the speed sensor, and at least one of the one or more control outputs being configured for connection to a brake system of the vehicle,
   wherein the brake control unit is configured to:
      generate a vehicle control signal to initiate a vehicle brake operation responsive to the vehicle speed indicated by the speed signal going above a designated first speed threshold and the speed signal meeting one or more first designated criteria in addition to the first speed threshold; and
      forgo generating the vehicle control signal responsive to the vehicle speed indicated by the speed signal going above a designated first speed threshold based on the designated criteria indicating a false positive, wherein the false positive is associated with a transient event of the vehicle.

2. The system of claim 1, wherein the vehicle brake operation initiated by the vehicle control signal includes activation of an operator alerter that is configured to generate an alert and to control the brake system to automatically brake the vehicle responsive to an operator failing to respond in a designated manner to the alert.

3. The system of claim 1, wherein the one or more first designated criteria include an acceleration of the vehicle being below a designated acceleration threshold.

4. The system of claim 1, wherein the one or more first designated criteria include the vehicle speed failing to fall to a designated second speed threshold within a designated time period, the second speed threshold being less than the first speed threshold and at or within twenty percent of the first speed threshold from zero.

5. The system of claim 1, wherein the one or more first designated criteria include the vehicle speed staying above the designated first speed threshold for a designated time period.

6. The system of claim 1, wherein the brake control unit is further configured to receive operational data relating to one or more operational conditions of the vehicle other than the vehicle speed, and to generate the vehicle control signal to initiate the vehicle brake operation responsive to all of: the vehicle speed indicated by the speed signal going above the designated first speed threshold; and the speed signal meeting the one or more first designated criteria in addition to the first speed threshold; and the operational data meeting one or more second designated criteria different than the first designated criteria.

7. The system of claim 6, wherein the operational data includes a location of the vehicle, and the one or more second designated criteria include at least one of the vehicle being outside a yard or other designated area or the vehicle being off a grade.

8. A system comprising:
   a brake control unit configured to be operably deployed onboard a vehicle and having one or more sensor inputs and one or more control outputs, at least one of the one or more sensor inputs configured to receive a speed signal from a speed sensor of the vehicle, the speed signal indicative of a vehicle speed detected by the speed sensor, and at least one of the one or more control outputs being configured for connection to a brake system of the vehicle,
   wherein the brake control unit includes a mitigation unit and an automatic brake actuator, the automatic brake actuator configured to automatically generate a vehicle control signal to initiate a vehicle brake operation responsive to the vehicle speed indicated by the speed signal going above a designated first speed threshold; and
   wherein the mitigation unit is configured to disable the automatic brake actuator from automatically generating the vehicle control signal responsive to:
      the vehicle speed indicated by the speed signal going above a designated first speed threshold based on one or more first designated criteria indicating a false positive, wherein the false positive is associated with a transient event of the vehicle, or
      the vehicle speed indicated by the speed signal going above a designated first speed threshold based on received operational data meeting one or more second designated criteria indicating the false positive, wherein the second designated criteria is different than the first designated criteria, the operational data relating to one or more operational conditions of the vehicle other than the speed, and the false positive is associated with a transient event of the vehicle.

9. The system of claim 8, wherein the vehicle brake operation initiated by the vehicle control signal includes activation of an operator alerter that is configured to generate an alert and to control the brake system to brake the vehicle responsive to an operator failing to respond in a designated manner to the alert.

10. The system of claim 8, wherein the one or more first designated criteria include an acceleration of the vehicle being above a designated acceleration threshold.

11. The system of claim 8, wherein the one or more first designated criteria include the speed falling to a designated second speed threshold within a designated time period, the second speed threshold being less than the first speed threshold and at or within twenty percent of the first speed threshold from zero.

12. The system of claim 8, wherein the one or more first designated criteria include the speed going below the designated first speed threshold within a designated time period.

13. The system of claim 8, wherein the operational data includes a location of the vehicle, and the one or more second designated criteria include at least one of the vehicle being inside a yard or other designated area or the vehicle being on a grade.

14. The system of claim 8, wherein the operational data includes one or more of acceleration data from an acceleration sensor operably attached to a vehicle coupler or attached elsewhere to the vehicle, strain data from a strain gauge operably attached to the vehicle coupler or attached elsewhere to the vehicle, or sound data from an acoustic sensor operably attached to the vehicle, and the one or more second designated criteria include the acceleration data, the strain data, or the sound data indicating a coupling operation of another vehicle being coupled to the vehicle.

15. The system of claim 14, wherein the operational data includes a coupling request status, and the one or more second designated criteria include the coupling request status being indicative of a coupling request to couple the vehicle with other vehicles.

16. A method comprising:
with a brake control unit operably deployed onboard a vehicle and having one or more processors:
receiving a speed signal from a speed sensor of the vehicle, the speed signal indicative of a vehicle speed detected by the speed sensor; and
generating a vehicle control signal to initiate a vehicle brake operation responsive to the speed indicated by the speed signal going above a designated first speed threshold and the speed signal meeting one or more first designated criteria in addition to the first speed threshold; and
forgoing generation of the vehicle control signal responsive to the vehicle speed indicated by the speed signal going above a designated first speed threshold based on the designated criteria indicating a false positive, wherein the false positive is associated with a transient event of the vehicle.

17. The method of claim 16, wherein the vehicle brake operation includes activation of an operator alerter that is configured to generate an alert and to control a brake system of the vehicle to brake the vehicle responsive to an operator failing to respond in a designated manner to the alert.

18. The method of claim 16, wherein the one or more first designated criteria include an acceleration of the vehicle being below a designated acceleration threshold.

19. The method of claim 16, wherein the one or more first designated criteria include the speed failing to fall to a designated second speed threshold within a designated time period, the second speed threshold being less than the first speed threshold and at or within twenty percent of the first speed threshold from zero.

20. The method of claim 16, wherein the one or more first designated criteria include the speed staying above the designated first speed threshold for a designated time period.

* * * * *